(12) United States Patent
In et al.

(10) Patent No.: US 8,776,507 B2
(45) Date of Patent: Jul. 15, 2014

(54) SYSTEM AND METHOD FOR REGENERATING GASOLINE PARTICULATE FILTER

(75) Inventors: Chibum In, Yongin-si (KR); Ki Young Yoon, Seoul (KR)

(73) Assignee: Hyundai Motor Company, Seoul (KR)

( * ) Notice: Subject to any disclaimer, the term of this patent is extended or adjusted under 35 U.S.C. 154(b) by 203 days.

(21) Appl. No.: 13/533,073

(22) Filed: Jun. 26, 2012

(65) Prior Publication Data
US 2013/0091828 A1 Apr. 18, 2013

(30) Foreign Application Priority Data
Oct. 13, 2011 (KR) .................... 10-2011-0104660

(51) Int. Cl.
*F01N 3/025* (2006.01)
(52) U.S. Cl.
USPC ............ 60/295; 60/274; 60/277; 60/285; 60/286; 60/297; 60/300; 60/303; 60/311; 60/320
(58) Field of Classification Search
USPC .......... 60/274, 277, 285, 286, 295, 297, 299, 60/300, 303, 311, 320
See application file for complete search history.

(56) References Cited

U.S. PATENT DOCUMENTS

| | | |
|---|---|---|
| 2009/0193796 A1 | 8/2009 | Wei et al. |
| 2010/0256894 A1* | 10/2010 | Yasui .......................... 701/108 |
| 2011/0072794 A1* | 3/2011 | Van Nieuwstadt et al. ..... 60/285 |
| 2011/0073088 A1* | 3/2011 | Hubbard et al. .............. 123/703 |
| 2011/0219752 A1* | 9/2011 | Gonze et al. .................... 60/286 |
| 2012/0031072 A1* | 2/2012 | Gonze et al. .................... 60/273 |

FOREIGN PATENT DOCUMENTS

| | | |
|---|---|---|
| JP | 2002-303175 A | 10/2002 |
| JP | 2004-190666 A | 7/2004 |
| JP | 2004-232544 A | 8/2004 |
| JP | 3852351 B2 | 9/2006 |
| JP | 2010-013974 A | 1/2010 |
| JP | 2010-112345 A | 5/2010 |
| JP | 2011-117438 A | 6/2011 |

* cited by examiner

*Primary Examiner* — Thomas Denion
*Assistant Examiner* — Jorge Leon, Jr.
(74) *Attorney, Agent, or Firm* — Morgan, Lewis & Bockius LLP

(57) ABSTRACT

A system for regenerating a particulate filter mounted on an exhaust pipe of a gasoline engine including a plurality of cylinders and an ignition device for igniting fuel and air in the cylinder, a three-way catalyst device mounted on the exhaust pipe connected to the gasoline engine, and to oxidize or reduce exhaust gas, the particulate filter mounted on the exhaust pipe downstream of the three-way catalyst device to trap particulate matter and regenerate the particulate matter using heat of the exhaust gas, a differential pressure sensor mounted upstream and downstream of the particulate filter and to measure a pressure difference of the particulate filter, and a control portion to receive the measured pressure difference and control parameters to determine an amount of non-ignited fuel which is not ignited and flows to the three-way catalyst device among the fuel flowing into the plurality of cylinders.

7 Claims, 4 Drawing Sheets

SYSTEM AND METHOD FOR REGENERATING GASOLINE PARTICULATE FILTER

CROSS-REFERENCE TO RELATED APPLICATION

The present application claims priority of Korean Patent Application Number 10-2011-0104660 filed Oct. 13, 2011, the entire contents of which application is incorporated herein for all purposes by this reference.

BACKGROUND OF INVENTION

1. Field of Invention

The present invention relates to a system and a method for regenerating a particulate filter. More particularly, the present invention relates to a system and method for regenerating a particulate filter of a gasoline engine.

2. Description of Related Art

Generally, a gasoline direct injection (GDI) art has been developed so as to improve fuel consumption efficiency and performance of an internal combustion engine, wherein the GDI engine does not inject fuel into an intake pipe, but directly injects the fuel into a combustion chamber.

Since the air/fuel ratio is low (rich mode) around a spark plug, an engine is operated in a lean fuel condition, but there is a problem that a gasoline direct injection engine (GDI) generates a large amount of particulate matter (PM) according to an incomplete combustion period increment in a combustion chamber.

Accordingly, a particulate filter is mounted in a gasoline direct injection engine (GDI) vehicle. Because the temperature in the particulate filter, however, is low and oxygen concentration in the particulate filter is low, it is difficult to passively regenerate particulate matter (PM) in the particulate filter.

In a conventional art, various devices for supplying oxygen to a particulate filter have been developed so as to resolve such problems. That is, regeneration of the particulate filter is performed as a consequence of the particulate matter (PM) trapped in the particulate filter being oxidized and eliminated by supplying additional air to the front end of the particulate filter mounted on an exhaust pipe.

Exhaust gas exhausted from the gasoline engine is purified when passing through a three-way catalyst device. Particularly, when the air-fuel ratio in a cylinder is a stoichiometric air-fuel ratio, the exhaust gas can be very effectively purified. If air, however, is additionally supplied for regenerating the particulate filter (i.e., the air/fuel ratio is high), nitrogen oxide ($NO_x$) in the exhaust gas is hardly reduced.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a system and a method for regenerating a particulate filter having advantages of effectively purifying exhaust gas and regenerating the particulate filter.

Various aspects of the present invention provide for a system and a method for regenerating a particulate filter having further advantages of increasing the temperature of the particulate filter to a regeneration temperature and securing purification performance of a three-way catalyst device by maintaining a ratio of air and fuel flowing into a cylinder of a gasoline engine to be a stoichiometric air-fuel ratio.

Various aspects of the present invention provide for a system for regenerating a particulate filter that may be mounted on an exhaust pipe of a gasoline engine. The gasoline engine may include a plurality of cylinders and an ignition device for igniting fuel and air in the cylinder. The system may include a three-way catalyst device mounted on the exhaust pipe connected to the gasoline engine, and adapted to oxidize or reduce exhaust gas exhausted from the gasoline engine, the particulate filter mounted on the exhaust pipe downstream of the three-way catalyst device and adapted to trap particulate matter contained in the exhaust gas and regenerate the particulate matter by using heat of the exhaust gas, a differential pressure sensor mounted upstream and downstream of the particulate filter and adapted to measure a pressure difference of the particulate filter, and a control portion adapted to receive the measured pressure difference and control parameters so as to determine an amount of non-ignited fuel which is not ignited and flows to the three-way catalyst device among the fuel flowing into the plurality of cylinders.

The control portion may determine the number of non-ignited cylinders at which ignition is stopped or an ignition stop ratio depending on the amount of non-ignited fuel, and is adapted to stop the ignition at the respective non-ignited cylinders after the fuel and the air flow into the non-ignited cylinders.

The control portion may be adapted to flow the fuel into each cylinder such that a portion of the fuel flows into each cylinder before the ignition and another portion of the fuel flows into each cylinder after the ignition, wherein the control portion determines the fuel amount flowing into each cylinder before the ignition and the fuel amount flowing into each cylinder after the ignition depending on the determined amount of the non-ignited fuel.

The control parameters may include a driving condition of the gasoline engine.

The control parameters may include a temperature of the three-way catalyst device.

Various aspects of the present invention provide for a method for regenerating a particulate filter that can be applied to the system, in which the method may include comparing a pressure difference of the particulate filter to a predetermined pressure difference during operation of the gasoline engine, determining an amount of non-ignited fuel which is not ignited and flows to the three-way catalyst device among the fuel flowing into the plurality of cylinders in a case that the pressure difference of the particulate filter is larger than or equal to the predetermined pressure difference, oxidizing the non-ignited fuel flowing out from the gasoline engine in the three-way catalyst device, and regenerating the particulate filter using oxidation heat generated in the three-way catalyst device.

The method may include comparing a temperature of the three-way catalyst device to a predetermined temperature for protecting the three-way catalyst device while regenerating the particulate filter, determining whether the particulate filter continues to be regenerated in a case that the temperature of the three-way catalyst device is higher than or equal to the temperature for protecting the three-way catalyst device, and re-determining the amount of non-ignited fuel in a case that continuation of the regeneration of the particulate filter is determined The method may include determining the number of non-ignited cylinders at which ignition is stopped or an ignition stop ratio depending on the amount of non-ignited fuel after determining the amount of non-ignited fuel.

The method may include comparing a temperature of the three-way catalyst device to a predetermined temperature for protecting the three-way catalyst device, determining whether the particulate filter continues to be regenerated in a case that the temperature of the three-way catalyst device is higher than or equal to the temperature for protecting the three-way catalyst device, re-determining the amount of the non-ignited fuel in a case that continuation of the regeneration of the particulate filter is determined, and re-determining the number of non-ignited cylinders at which ignition is stopped or the ignition stop ratio depending on the amount of the non-ignited fuel after re-determining the amount of the non-ignited fuel.

The method may include determining a fuel amount flowing into each cylinder before the ignition and a fuel amount flowing into each cylinder after the ignition depending on the determined amount of the non-ignited fuel, and controlling fuel injection depending on the fuel amount flowing into each cylinder before the ignition and the fuel amount flowing into each cylinder after the ignition.

The method may include comparing a temperature of the three-way catalyst device to a predetermined temperature for protecting the three-way catalyst device, determining whether the particulate filter continues to be regenerated in a case that the temperature of the three-way catalyst device is higher than or equal to the temperature for protecting the three-way catalyst device, re-determining the amount of non-ignited fuel in a case that continuation of the regeneration of the particulate filter is determined, and re-determining the fuel amount flowing into each cylinder before the ignition and the fuel amount flowing into each cylinder after the ignition depending on the re-determined amount of the non-ignited fuel.

The amount of non-ignited fuel may be determined according to a driving condition of the gasoline engine.

The amount of non-ignited fuel may be re-determined according to a driving condition of the gasoline engine and the temperature of the three-way catalyst device.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
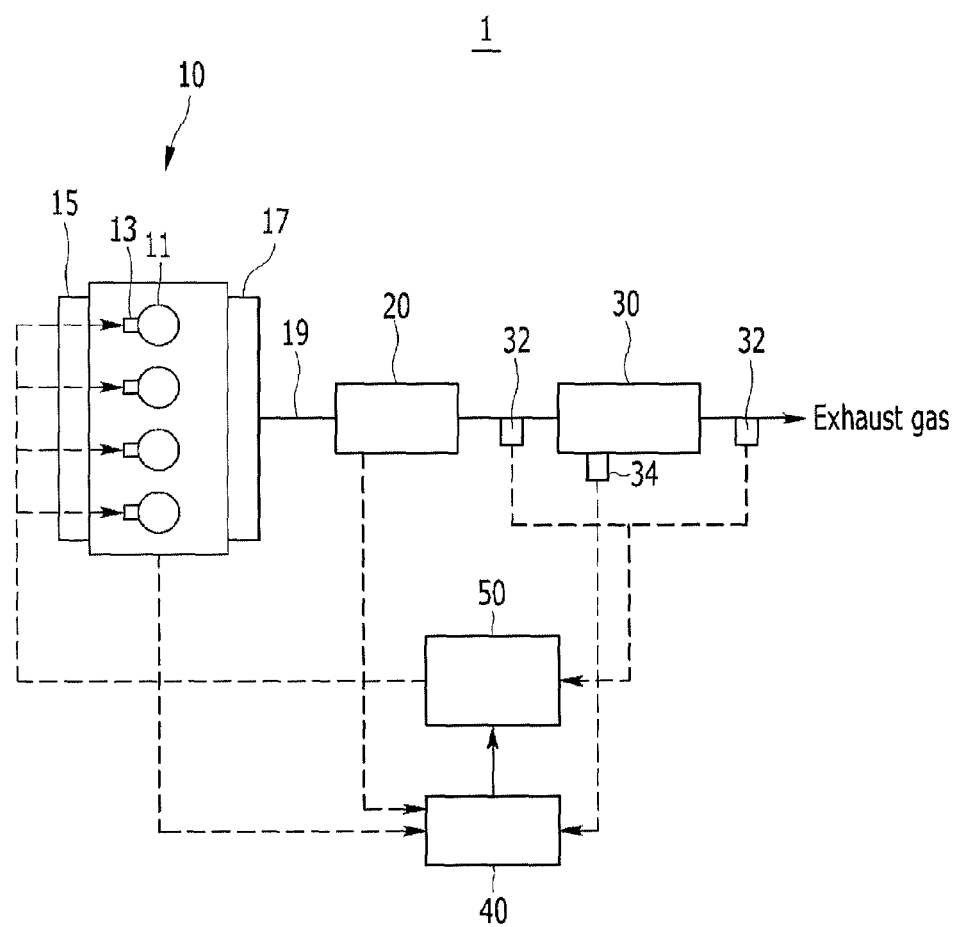
FIG. 1 is a schematic diagram of an exemplary system for regenerating a particulate filter according to the present invention.

FIG. 1 is a schematic diagram of a system for regenerating a particulate filter according to various embodiments of the present invention.

As shown in FIG. 1, a system 1 for regenerating a particulate filter according to various embodiments of the present invention includes a gasoline engine 10, a three-way catalyst device 20, a particulate filter 30, a control parameter measuring portion 40, and a control portion 50.

The gasoline engine 10 is an internal combustion engine using gasoline as a fuel, and burns fuel and air so as to convert chemical energy into mechanical energy. The gasoline engine 10 includes a plurality of cylinders 11 into which the fuel and the air flow and an ignition device for igniting the fuel and the air flowing into the cylinder 11. The gasoline engine 10 is connected to an intake manifold 15 so as to receive the air in the cylinder 11, and is connected to an exhaust manifold 17 such that exhaust gas generated in a combustion process is gathered in the exhaust manifold 17 and is exhausted to the exterior through an exhaust pipe 19. An injector 13 is mounted at the cylinder 11 so as to inject the fuel into the cylinder 11.

The three-way catalyst device 20 is mounted on the exhaust pipe 19 connected to the gasoline engine 10, and is adapted to oxidize or reduce the exhaust gas exhausted from the gasoline engine 10. Generally, the three-way catalyst device 20 converts toxic chemicals (CO, HC, and $NO_x$) in the exhaust gas into harmless gases ($CO_2$, $H_2O$, $N_2$, and $O_2$) by way of an oxidation-reduction reaction.

The three-way catalyst device 20 is a catalytic converter to stimulate the oxidation-reduction reaction and generally includes platinum (Pt) and rhodium (Rh). The platinum catalyst stimulates the oxidation reaction to reduce carbon monoxide (CO) and hydrocarbon (HC), and the rhodium catalyst stimulates reduction reaction to reduce nitrogen oxide ($NO_x$). The three-way catalyst device 20 efficiently reduces toxic chemicals (CO, HC, and $NO_x$) simultaneously when the air and fuel in a stoichiometric air-fuel ratio flows into the cylinder 11. Here, the stoichiometric air-fuel ratio is an ideal ratio of air to fuel for perfect combustion of the fuel. If the air-fuel ratio is lean (i.e., air is rich), nitrogen oxide ($NO_x$) is hardly reduced while carbon monoxide (CO) and hydrocarbon (HC) are remarkably reduced. Also, if the air-fuel ratio is rich (i.e., air is lean), nitrogen oxide ($NO_x$) is remarkably reduced while carbon monoxide (CO) and hydrocarbon (HC) are hardly reduced. Therefore, the gasoline engine 10 is adapted to control the ratio of the air to the fuel to be the stoichiometric air-fuel ratio by using an oxygen sensor and the control portion 50.

The particulate filter 30 is mounted on the exhaust pipe 19 downstream of the three-way catalyst device 20 and is adapted to trap particulate matter (PM) contained in the exhaust gas. The particulate matter (PM) mainly consists of hydrocarbon that is called soot. The particulate filter 30 traps particulate matter (PM) using a catalyst filter. The catalyst is formed as a honeycomb shape, is made through a special coating treatment, and absorbs particulate matter (PM).

If the particulate filter 30 traps a predetermined amount of particulate matter (PM), the particulate filter 30 performs a regeneration process to oxidize and eliminate the particulate matter (PM). At that time, the temperature of the particulate filter 30 should be higher than or equal to a predetermined temperature and the oxygen concentration in the particulate filter 30 should be higher than or equal to a predetermined oxygen concentration so as to oxidize the particulate matter (PM). In other words, since the temperature and the oxygen concentration are too low to oxidize the particulate matter (PM) while the gasoline engine 10 is normally operated, it is impossible to passively regenerate the particulate filter 30. Therefore, heat and/or oxygen are supplied from the outside to the particulate filter 30 such that the temperature and the oxygen concentration of the particulate filter are a regeneration temperature and regeneration oxygen concentration. The regeneration temperature and the regeneration oxygen concentration mean a temperature range and an oxygen concentration range within which the particulate filter 30 can be regenerated.

A differential pressure sensor 32 is mounted upstream and downstream of the particulate filter 30 and is adapted to measure a pressure difference of the particulate filter 30. That is, the differential pressure sensor 32 detects a pressure of the exhaust gas flowing into the particulate filter 30 and a pressure of the exhaust gas exhausted from the particulate filter 30, and measures a difference between the detected pressures, that is the pressure difference. The pressure difference of the particulate filter 30 is generated as a consequence of particulate matter (PM) being trapped in the particulate filter 30 and hindering the flow of the exhaust gas. The differential pressure sensor 32 delivers the measured pressure difference of the particulate filter 30 to the control portion 50.

The control parameter measuring portion 40 is adapted to measure control parameters for regenerating the particulate filter 30. In various embodiments, the control parameters may include driving conditions of the gasoline engine 10 according to driving modes (high load mode or low load mode), the temperature of the three-way catalyst device 20, the temperature of the particulate filter 30, and/or the oxygen concentration of the exhaust gas. The control parameter measuring portion 40 delivers the measured control parameters to the control portion 50.

The control portion 50 is adapted to receive the differential pressure measured by the differential pressure sensor 32 and the control parameters detected by the control parameter measuring portion 40. The control portion 50 is adapted to control the regeneration of the particulate filter 30 by means of the received data.

The control portion 50 is adapted to totally control the system 1 for regenerating the particulate filter. The control portion 50 compares a pressure difference of the particulate filter with a predetermined pressure difference so as to determine whether or not the particulate filter 30 regenerates. The control portion 50 determines the amount of non-ignited fuel considering the control parameters in a case that the pressure difference of the particulate filter is larger than the predetermined pressure difference. The amount of non-ignited fuel is an amount of fuel which is not ignited in the cylinder 11. That is, some fuel that flows into the plurality of cylinders 11 in the gasoline engine 10 is not ignited and is exhausted through the exhaust pipe 19 to the exhaust gas purifying device. As described above, the amount of non-ignited fuel is determined by the control parameters such as the driving condition of the gasoline engine 10, the temperature of the three-way catalyst device, and so on.

The fuel that is not ignited may be exhausted by various methods.

According to various embodiments, the control portion 50 determines the number of non-ignited cylinders 11 at which the ignition is stopped or an ignition stop ratio depending on the amount of non-ignited fuel. In other words, since the fuel amount flowing into each cylinder 11 of the gasoline engine 10 is determined according to the stoichiometric air-fuel ratio, the control portion 50 can determine the number of non-ignited cylinders 11 by comparing the fuel amount flowing into each cylinder 11 to the amount of the non-ignited fuel. Therefore, the control portion 50 is adapted to stop the ignition in some of the cylinders 11 depending on the number of non-ignited cylinders 11. The fuel and the air in the cylinders 11 at which the ignition is stopped are not ignited and burned, and are exhausted to the exhaust pipe 19 through the exhaust manifold 17.

According to various embodiments, the control portion 50 is adapted to control the injector 13 such that a portion of the fuel flows into each cylinder before the ignition and another portion of the fuel flows into each cylinder after the ignition, and determines the fuel amount flowing into each cylinder before the ignition and the fuel amount flowing into each cylinder after the ignition depending on the determined amount of non-ignited fuel. In other words, the control portion 50 is not adapted to stop ignition in some cylinders 11, but to flow the fuel into each cylinder such that a portion of the fuel flows into each cylinder before the ignition and another portion of the fuel flows into each cylinder after the ignition. Therefore, the portion of the fuel that flows into each cylinder before the ignition is burned by the ignition at the rich air (i.e., the air-fuel ratio is lean), and the other portion of the fuel that flows into each cylinder after the ignition is not ignited or burned. Here, the amount of the non-ignited fuel is equal to the fuel amount which flows into each cylinder after the ignition. The fuel which flows into each cylinder after the ignition as well as unburned oxygen and combustion products are exhausted to the exhaust pipe 19 through the exhaust manifold 17.

Such a system 1 for regenerating the particulate filter 30 performs the regeneration of the particulate filter 30 depending on the amount of the non-ignited fuel determined by the control portion 50. In other words, the system 1 for regenerating the particulate filter exhausts fuel flowing into the cylinder 11 in a non-ignited state, and oxidizes the exhausted fuel at the three-way catalyst device 20 so as to regenerate the particulate filter 30 by oxidation heat.

Figure 2:
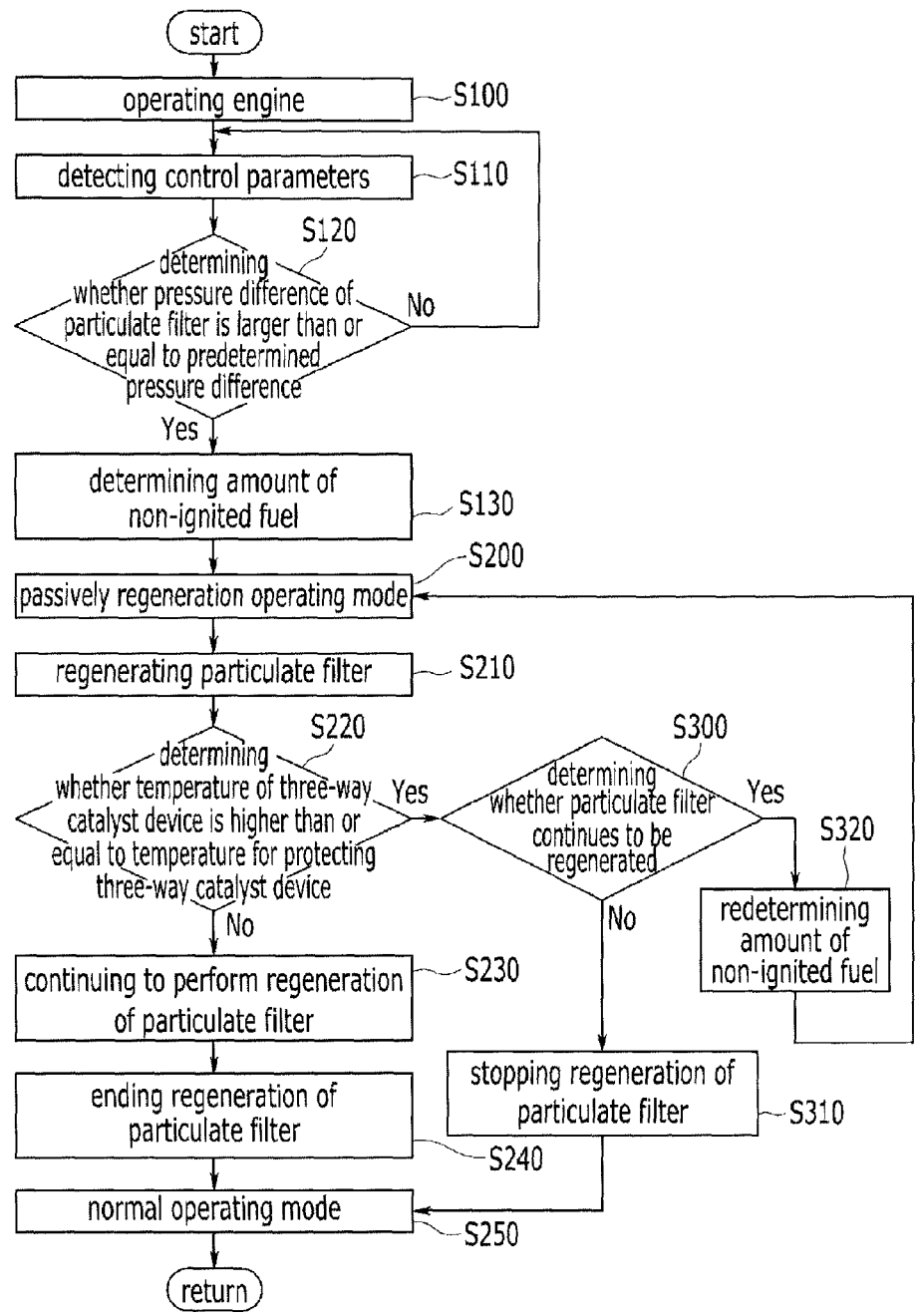
FIGS. 2, 3 and 4 are flowcharts of an exemplary method for regenerating a particulate filter according to the present invention.
Figure 3:
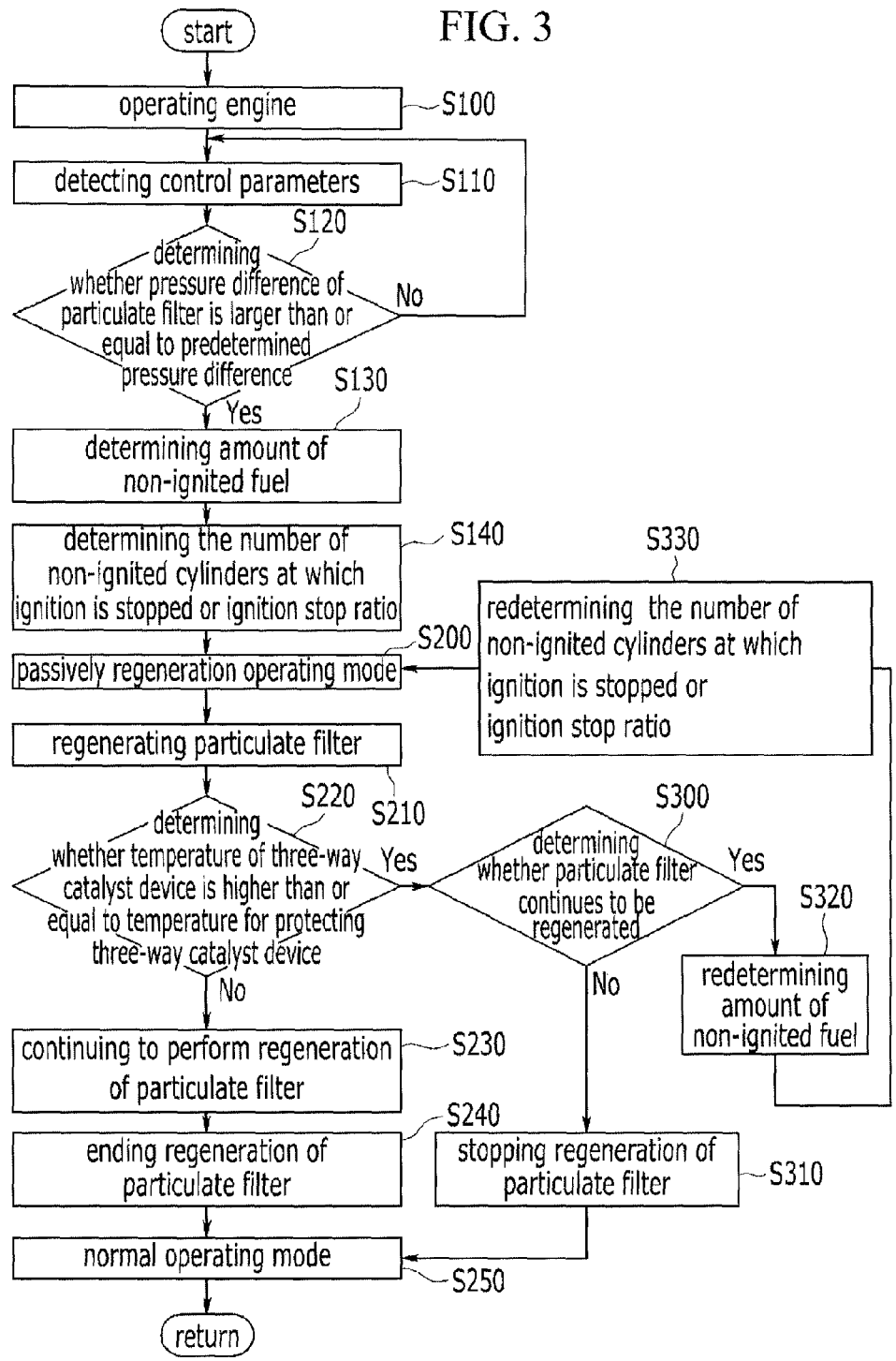
Figure 4:
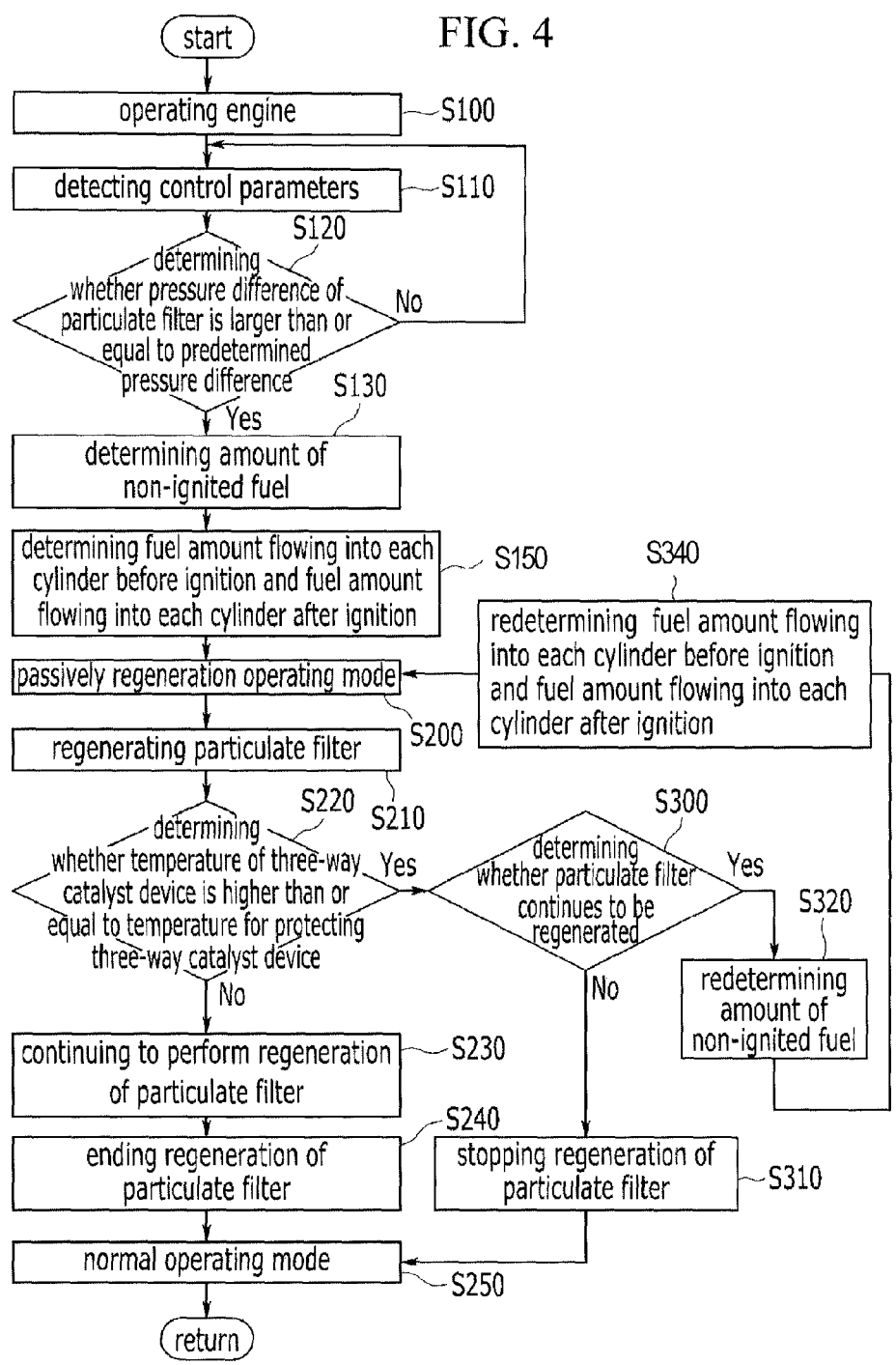

FIG. 2 to FIG. 4 are flowcharts of a method for regenerating the particulate filter according to various embodiments of the present invention.

Referring to FIG. 2 to FIG. 4, a regenerating method using the system 1 for regenerating the particulate filter will be described in detail.

Referring to FIG. 2, the regeneration of the particulate filter 30 is performed while the engine operates at step S100. As described above, particulate matter (PM) which is trapped in the particulate filter 30 generates a pressure difference between upstream and downstream of the particulate filter 30. Therefore, the differential pressure sensor 32 detects the pressure upstream of the particulate filter 30 and the pressure downstream of the particulate filter 30 so as to measure the pressure difference of the particulate filter 30. Also, the control parameter measuring portion 40 measures the control parameters for regenerating the particulate filter 30 such as the driving condition of the gasoline engine 10, the temperature of the three-way catalyst device 20, the temperature of the particulate filter 30, and so on at step S110.

The control portion 50 compares the pressure difference of the particulate filter to a predetermined pressure difference at step S120. In a case that the pressure difference of the particulate filter is larger than or equal to the predetermined pressure difference, the control portion 50 determines the amount of the non-ignited fuel considering the control parameters at step S130. Particularly, the amount of non-ignited fuel at the step S130 is determined according to the driving condition such as rotation speed of the gasoline engine 10 among the control parameters. As described above, the amount of non-ignited fuel is an amount of fuel which is not ignited in the cylinder 11. That is, some fuel that flows into a plurality of cylinders 11 in the gasoline engine 10 is not ignited and is exhausted through the exhaust pipe 19 to the exhaust gas purifying device. Therefore, fuel which flows into the cylinders 11 is classified as ignited fuel and non-ignited fuel.

If the control portion 50 determines the amount of non-ignited fuel, the system 1 for regenerating the particulate filter is regenerated passively by the non-ignited fuel at step S200. In other words, some of the fuel flowing into the cylinders 11 is not ignited and burned and is exhausted to the three-way catalyst device 20, and the non-ignited and unburned fuel is oxidized by non-ignited and/or unburned oxygen at the three-way catalyst device according to the amount of non-ignited fuel determined by the control portion 50. The exhaust gas enters a high-temperature state by the oxidation heat which is generated at the three-way catalyst device 20.

As described above, the fuel and the air according to the stoichiometric air-fuel ratio flow into the cylinder 11 of the gasoline engine 10. Although the fuel flowing into the cylinder 11 is not ignited, the fuel and the air in the cylinder 11 maintain the stoichiometric air-fuel ratio and are exhausted to the three-way catalyst device 20. Therefore, the three-way catalyst device 20 can oxidize the non-ignited fuel and also reduce toxic chemicals (CO, HC, and $NO_X$) of the exhaust gas effectively.

The high-temperature exhaust gas flows into the particulate filter 30 through the exhaust pipe 19. As a result, the particulate filter 30 secures the regeneration temperature. Therefore the particulate filter 30 performs the regeneration where particulate matter (PM) is oxidized and eliminated using heat and oxygen obtained from the high-temperature exhaust gas at step S210.

While the regeneration of the particulate filter 30 is performed, the temperature of the three-way catalyst device 20 can rise to a certain temperature by the oxidation heat of the non-ignited fuel. If the temperature of the three-way catalyst device 20 becomes higher than or equal to the certain temperature (e.g., 950° C.), the catalyst in the three-way catalyst device 20 may be damaged.

Therefore, the control portion 50 compares the predetermined temperature for protecting the three-way catalyst device 20 to a temperature of the three-way catalyst device 20 which is detected by the control parameter measuring portion 40 at step S220.

If the temperature of the three-way catalyst device 20 is lower than the predetermined temperature for protecting the three-way catalyst device 20, the particulate filter 30 continues to perform the regeneration at step S230. If the particulate matter (PM) of the particulate filter 30 is eliminated by the regeneration of the particulate filter 30, the pressure difference of the particulate filter 30 gradually decreases. If the pressure difference of the particulate filter 30 is lower than the predetermined pressure difference, the regeneration of the particulate filter 30 is ended at step S240 and the system 1 for regenerating the particulate filter is converted to a normal operating mode at step S250.

If the temperature of the three-way catalyst device 20, however, is higher than or equal to the temperature for protecting the three-way catalyst device 20, the control portion 50 determines whether the particulate filter 30 continues to be regenerated at step S300. If it is determined that the regeneration of the particulate filter 30 is continued, the control portion 50 re-determines the amount of the non-ignited fuel considering the driving condition of the gasoline engine 10 and the temperature of the three-way catalyst device 20 at step S320. Therefore, the system 1 for regenerating the particulate filter 30 passively regenerates the particulate filter 30 according to the re-determined amount of the non-ignited fuel. If it is determined that the regeneration of the particulate filter 30 cannot be continued, the control portion 50 is adapted to stop the regeneration of the particulate filter 30 and the system 1 for regenerating the particulate filter is converted to the normal operating mode at step S250.

As described above, after the amount of the non-ignited fuel is determined, the fuel in the cylinder 11 may not be ignited and may be exhausted by various methods.

As shown in FIG. 3, after determining the amount of the non-ignited fuel, the control portion 50 determines the number of the non-ignited cylinders 11 or the ignition stop ratio depending on the amount of the non-ignited fuel at step S140 according to various embodiments of the present invention. The control portion 50 is adapted to stop the ignition in some of the cylinders 11 depending on the number of non-ignited cylinders 11 or the ignition stop ratio. Therefore, the system 1 for regenerating the particulate filter 30 passively regenerates the particulate filter 30 at step S200. That is, the fuel and the air of the cylinders 11 at which the ignition is stopped are not ignited and burned, and are exhausted to the three-way catalyst device 20 through the exhaust pipe 19. The following processes are the same as in the method for regenerating the particulate filter as shown in FIG. 2. Meanwhile, in a case that the temperature of the three-way catalyst device is higher than or equal to the temperature for protecting the three-way catalyst device and the amount of the non-ignited fuel should be re-determined, the control portion 50 re-determines the number of non-ignited cylinders or the ignition stop ratio depending on the re-determined amount of the non-ignited fuel at step S330.

As shown in FIG. 4, after determining the amount of the non-ignited fuel, the control portion 50 determines the fuel amount flowing into each cylinder before the ignition and the fuel amount flowing into each cylinder after the ignition depending on the determined amount of the non-ignited fuel at step S150 according to various embodiments of the present invention. The control portion 50 is adapted to control the injectors 13 such that the fuel flows into each cylinder 11 before the ignition and/or after the ignition. Instead of stopping the ignition of some cylinders 11, the control portion 50 is adapted to flow the fuel into each cylinder such that a portion of the fuel flows into each cylinder before the ignition and another portion of the fuel flows into each cylinder after the ignition. Therefore, the system 1 for regenerating the particulate filter passively regenerates the particulate filter 30 at step S200. That is, the portion of the fuel which flows into each cylinder 11 before the ignition is burned with the air. In this case, the unburned oxygen as well as the other portion of the fuel which flows into each cylinder 11 after the ignition is not ignited and burned and is exhausted to the three-way catalyst device 20 through the exhaust pipe 19. The following processes are the same as in the method for regenerating the particulate filter as shown in FIG. 2. Meanwhile, in a case that the temperature of the three-way catalyst device is higher than or equal to the temperature for protecting the three-way catalyst device and the amount of the non-ignited fuel should be re-determined, the control portion 50 re-determines the fuel amount flowing into each cylinder 11 before the ignition and the fuel amount flowing into each cylinder 11 after the ignition depending on the re-determined amount of the non-ignited fuel at step S340.

As described above, the exhaust gas is effectively purified and the particulate filter performs the regeneration process according to various embodiments of the present invention.

Also, the present invention can increase the temperature of the particulate filter to a regeneration temperature and secure purification performance of a three-way catalyst device by maintaining a ratio of air and fuel flowing into a cylinder of a gasoline engine to be a stoichiometric air-fuel ratio.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for regenerating a particulate filter in a system for regenerating the particulate filter that comprises a gasoline engine, a three-way catalyst device to oxidize or reduce exhaust gas exhausted from the gasoline engine, and a particulate filter to trap particulate matter contained in the exhaust gas, comprising:
    comparing a pressure difference of the particulate filter to a predetermined pressure difference during operation of the gasoline engine;
    determining an amount of non-ignited fuel which is not ignited and flows to the three-way catalyst device among the fuel flowing into the plurality of cylinders if the pressure difference of the particulate filter is larger than or equal to the predetermined pressure difference;
    oxidizing the non-ignited fuel flowing out from the gasoline engine in the three-way catalyst device;
    regenerating the particulate filter using oxidation heat generated in the three-way catalyst device;
    comparing a temperature of the three-way catalyst device to a predetermined temperature for protecting the three-way catalyst device while regenerating the particulate filter;
    determining whether the particulate filter continues to be regenerated if the temperature of the three-way catalyst device is higher than or equal to the predetermined temperature for protecting the three-way catalyst device; and
    re-determining an amount of non-ignited fuel if continuation of the regeneration of the particulate filter is determined.

2. The method of claim 1, further comprising determining a number of non-ignited cylinders at which ignition is stopped or an ignition stop ratio depending on the amount of non-ignited fuel after determining the amount of non-ignited fuel.

3. The method of claim 1, further comprising:
    determining a fuel amount flowing into each cylinder before ignition and a fuel amount flowing into each cylinder after ignition depending on the determined amount of the non-ignited fuel; and
    controlling fuel injection depending on the fuel amount flowing into each cylinder before ignition and the fuel amount flowing into each cylinder after ignition.

4. The method of claim 1, wherein the amount of non-ignited fuel is determined according to a driving condition of the gasoline engine.

5. The method of claim 1, wherein the amount of non-ignited fuel is re-determined according to a driving condition of the gasoline engine and the temperature of the three-way catalyst device.

6. A method for regenerating a particulate filter in a system for regenerating the particulate filter that comprises a gasoline engine, a three-way catalyst device to oxidize or reduce exhaust gas exhausted from the gasoline engine, and a particulate filter to trap particulate matter contained in the exhaust gas, comprising:
    comparing a pressure difference of the particulate filter to a predetermined pressure difference during operation of the gasoline engine;
    determining an amount of non-ignited fuel which is not ignited and flows to the three-way catalyst device among the fuel flowing into the plurality of cylinders if the pressure difference of the particulate filter is larger than or equal to the predetermined pressure difference;
    oxidizing the non-ignited fuel flowing out from the gasoline engine in the three-way catalyst device;
    regenerating the particulate filter using oxidation heat generated in the three-way catalyst device;
    determining a number of non-ignited cylinders at which ignition is stopped or an ignition stop ratio depending on the amount of non-ignited fuel after determining the amount of non-ignited fuel;
    comparing a temperature of the three-way catalyst device to a predetermined temperature for protecting the three-way catalyst device;
    determining whether the particulate filter continues to be regenerated if the temperature of the three-way catalyst device is higher than or equal to the predetermined temperature for protecting the three-way catalyst device;
    re-determining an amount of the non-ignited fuel if continuation of the regeneration of the particulate filter is determined; and
    re-determining a number of non-ignited cylinders at which ignition is stopped or the ignition stop ratio depending on the amount of the non-ignited fuel after re-determining the amount of the non-ignited fuel.

7. A method for regenerating a particulate filter in a system for regenerating the particulate filter that comprises a gasoline engine, a three-way catalyst device to oxidize or reduce exhaust gas exhausted from the gasoline engine, and a particulate filter to trap particulate matter contained in the exhaust gas, comprising:
    comparing a pressure difference of the particulate filter to a predetermined pressure difference during operation of the gasoline engine;
    determining an amount of non-ignited fuel which is not ignited and flows to the three-way catalyst device among the fuel flowing into the plurality of cylinders if the pressure difference of the particulate filter is larger than or equal to the predetermined pressure difference;
    oxidizing the non-ignited fuel flowing out from the gasoline engine in the three-way catalyst device;
    regenerating the particulate filter using oxidation heat generated in the three-way catalyst device;
    determining a fuel amount flowing into each cylinder before ignition and a fuel amount flowing into each cylinder after ignition depending on the determined amount of the non-ignited fuel; and controlling fuel injection depending on the fuel amount flowing into each cylinder before ignition and the fuel amount flowing into each cylinder after ignition;

comparing a temperature of the three-way catalyst device to a predetermined temperature for protecting the three-way catalyst device;

determining whether the particulate filter continues to be regenerated if the temperature of the three-way catalyst device is higher than or equal to the predetermined temperature for protecting the three-way catalyst device;

re-determining an amount of non-ignited fuel if continuation of the regeneration of the particulate filter is determined; and re-determining a fuel amount flowing into each cylinder before ignition and the fuel amount flowing into each cylinder after ignition depending on the re-determined amount of the non-ignited fuel.

* * * * *